United States Patent
Cui et al.

(10) Patent No.: US 11,035,214 B2
(45) Date of Patent: Jun. 15, 2021

(54) POWER SUPPLY SEMI-TRAILER FOR ELECTRIC DRIVE FRACTURING EQUIPMENT

(71) Applicant: YANTAI JEREH PETROLEUM EQUIPMENT & TECHNOLOGIES CO., LTD., Yantai (CN)

(72) Inventors: Shuzhen Cui, Yantai (CN); Rikui Zhang, Yantai (CN); Dong Liu, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 16/834,446

(22) Filed: Mar. 30, 2020

(65) Prior Publication Data
US 2020/0392826 A1  Dec. 17, 2020

(30) Foreign Application Priority Data

Jun. 13, 2019 (CN) .......................... 201910510411.8

(51) Int. Cl.
*E21B 43/26* (2006.01)
*F04B 17/03* (2006.01)
(Continued)

(52) U.S. Cl.
CPC .......... *E21B 43/2607* (2020.05); *F04B 17/03* (2013.01); *H02K 7/1823* (2013.01); *H02K 11/046* (2013.01)

(58) Field of Classification Search
CPC ........................ E21B 43/2607; H02K 7/1823
(Continued)

(56) References Cited

U.S. PATENT DOCUMENTS 1,711,979 A * 5/1929 Weinert ................. H02K 17/14
310/202
2,015,745 A * 10/1935 Derl ....................... H02K 29/00
363/105
(Continued)

FOREIGN PATENT DOCUMENTS

CN       101636901 A      1/2010
CN       102574475 A      7/2012
(Continued)

OTHER PUBLICATIONS

PCT, International Search Report and Written Opinion of the International Searching Authority in PCT/CN2019/102811, dated Mar. 19, 2020, 10 pages.

*Primary Examiner* — Pedro J Cuevas
(74) *Attorney, Agent, or Firm* — Xsensus LLP

(57) ABSTRACT

The present invention discloses a power supply semi-trailer for electric drive fracturing equipment, including a combination of a gas turbine engine, a generator and a rectifying unit, the generator outputs a winding configuration and a voltage required for the rectifying units directly to obviate conventional rectifier transformer equipment. The rectifying unit is connected to the inversion unit through a common DC bus, so that the common DC bus can separately drive multiple inversion units, thus decreasing the wirings of power supply lines. A high voltage inversion unit is disposed on a gooseneck of the electric drive semi-trailer to optimize the spatial arrangement of equipment. The entire power supply equipment has a compact structure, occupies a small area, and is simple in wiring.

8 Claims, 2 Drawing Sheets

(51) Int. Cl.
 *H02K 7/18* (2006.01)
 *H02K 11/04* (2016.01)
(58) Field of Classification Search
 USPC .............. 290/1 A, 1 R; 166/308.1; 310/179
 See application file for complete search history.

(56) References Cited

U.S. PATENT DOCUMENTS

| | | | | |
|---|---|---|---|---|
| 3,035,222 A * | 5/1962 | Stone | | H02K 19/28 322/93 |
| 3,378,755 A * | 4/1968 | Elbert | | H02J 7/1484 322/29 |
| 3,453,443 A * | 7/1969 | Stoeckly | | F02C 6/02 290/2 |
| 4,136,432 A * | 1/1979 | Melley, Jr. | | B60P 3/00 29/469 |
| 4,336,485 A * | 6/1982 | Stroud | | H02J 7/1423 320/126 |
| 4,720,645 A * | 1/1988 | Stroud | | H02J 7/1423 310/68 D |
| 4,904,841 A * | 2/1990 | English | | B23K 9/1056 219/133 |
| 4,992,669 A * | 2/1991 | Parmley | | F01B 1/12 123/2 |
| 5,274,322 A * | 12/1993 | Hayashi | | H02K 3/28 310/198 |
| 5,517,822 A * | 5/1996 | Haws | | F01K 17/025 60/618 |
| 5,614,799 A * | 3/1997 | Anderson | | H02P 1/32 318/400.09 |
| 5,691,590 A * | 11/1997 | Kawai | | H02K 3/18 310/180 |
| 5,714,821 A * | 2/1998 | Dittman | | H02K 19/28 30/180 |
| 5,821,660 A * | 10/1998 | Anderson | | H02K 3/28 310/184 |
| 5,994,802 A * | 11/1999 | Shichijyo | | H02K 1/325 310/254.1 |
| 6,121,707 A * | 9/2000 | Bell | | H02K 3/522 310/179 |
| 6,281,610 B1 * | 8/2001 | Kliman | | H02K 13/00 310/143 |
| 6,331,760 B1 * | 12/2001 | McLane, Jr. | | H02K 17/30 310/179 |
| 6,388,869 B1 * | 5/2002 | Fauteux | | H02B 1/52 307/150 |
| 6,417,592 B2 * | 7/2002 | Nakamura | | H02K 3/12 310/184 |
| 6,450,133 B1 * | 9/2002 | Bernard | | F01P 5/04 123/2 |
| 6,455,974 B1 * | 9/2002 | Fogarty | | H02K 3/28 310/184 |
| 6,552,463 B2 * | 4/2003 | Oohashi | | H02K 3/12 310/184 |
| 6,704,993 B2 * | 3/2004 | Fogarty | | H02K 3/28 29/596 |
| 6,765,304 B2 * | 7/2004 | Baten | | F02B 63/04 290/1 A |
| 6,784,583 B2 * | 8/2004 | Umeda | | H02K 3/28 310/179 |
| 6,786,051 B2 * | 9/2004 | Kristich | | F01D 15/10 60/796 |
| 6,893,487 B2 * | 5/2005 | Alger | | B01D 46/10 55/385.1 |
| 6,895,903 B2 * | 5/2005 | Campion | | F02B 63/04 123/2 |
| 7,007,966 B2 * | 3/2006 | Campion | | B60P 3/00 123/2 |
| 7,016,207 B2 * | 3/2006 | Yamanaka | | H02M 1/32 363/132 |
| 7,075,206 B1 * | 7/2006 | Chen | | H02K 3/28 310/179 |
| 7,081,682 B2 * | 7/2006 | Campion | | F02B 63/04 123/2 |
| 7,112,891 B2 * | 9/2006 | Johnson | | H01M 8/04089 180/65.31 |
| 7,122,913 B2 * | 10/2006 | Witten | | F02B 63/04 290/1 A |
| 7,221,061 B2 * | 5/2007 | Alger | | F02B 63/04 290/1 A |
| 7,245,032 B2 * | 7/2007 | Willets | | H02J 9/08 290/1 A |
| 7,291,954 B2 * | 11/2007 | Kashihara | | H02K 3/505 310/184 |
| 7,372,174 B2 * | 5/2008 | Jones | | H02P 9/102 290/43 |
| 7,511,385 B2 * | 3/2009 | Jones | | H02M 5/4585 290/43 |
| 7,608,934 B1 * | 10/2009 | Hunter | | F02D 25/00 290/4 R |
| 7,615,877 B2 * | 11/2009 | Willets | | H02J 7/345 290/1 A |
| 7,619,319 B1 * | 11/2009 | Hunter | | B60L 53/18 290/4 R |
| 7,635,926 B2 * | 12/2009 | Willets | | H02J 7/345 307/64 |
| 7,656,052 B2 * | 2/2010 | Jones | | H02M 5/4585 290/43 |
| 7,667,342 B2 * | 2/2010 | Matsumoto | | B60K 6/26 290/40 C |
| 7,692,321 B2 * | 4/2010 | Jones | | H02P 9/102 290/43 |
| 7,755,209 B2 * | 7/2010 | Jones | | H02M 5/4585 290/44 |
| 7,921,914 B2 * | 4/2011 | Bruins | | E21B 43/26 166/177.5 |
| 8,159,082 B2 * | 4/2012 | Gemin | | H02J 7/1415 307/9.1 |
| 8,294,285 B2 * | 10/2012 | Hunter | | B60L 1/006 290/1 R |
| 8,294,286 B2 * | 10/2012 | Hunter | | F03G 7/08 290/1 R |
| 8,362,638 B2 * | 1/2013 | Gemin | | H02J 7/1415 307/9.1 |
| 8,495,869 B2 * | 7/2013 | Beissler | | F01N 13/00 60/274 |
| 8,519,591 B2 * | 8/2013 | Nishimura | | H02K 3/28 310/184 |
| 8,587,136 B2 * | 11/2013 | Williams | | F01K 13/00 290/1 A |
| 8,670,260 B2 * | 3/2014 | Wang | | H02M 1/12 363/131 |
| 8,773,876 B2 * | 7/2014 | Kuboyama | | H02M 7/487 363/98 |
| 8,789,601 B2 * | 7/2014 | Broussard | | E21B 43/26 166/177.5 |
| 8,796,899 B2 * | 8/2014 | Imazawa | | H02K 3/50 310/198 |
| 8,811,048 B2 * | 8/2014 | Zhang | | H02P 27/14 363/37 |
| 9,103,193 B2 * | 8/2015 | Coli | | F04B 49/20 |
| 9,140,110 B2 * | 9/2015 | Coli | | B01F 15/00538 |
| 9,166,495 B2 * | 10/2015 | Guan | | H02M 5/4585 |
| 9,209,704 B2 * | 12/2015 | Huang | | H02M 5/40 |
| 9,534,473 B2 * | 1/2017 | Morris | | F02C 7/055 |
| 9,562,420 B2 * | 2/2017 | Morris | | F02C 7/052 |
| 9,577,545 B2 * | 2/2017 | Tan | | H02J 3/381 |
| 9,641,112 B2 * | 5/2017 | Harknett | | H02P 9/006 |
| 10,184,397 B2 * | 1/2019 | Austin | | F02C 6/00 |
| 10,411,635 B2 * | 9/2019 | Takahashi | | H02K 3/345 |
| 10,523,130 B2 * | 12/2019 | Bax | | H02M 7/487 |
| 10,584,671 B2 * | 3/2020 | Tunzini | | H02P 29/0241 |
| 2003/0030246 A1 * | 2/2003 | Campion | | B60P 3/00 280/423.1 |
| 2003/0033994 A1 * | 2/2003 | Campion | | F02B 63/04 123/41.56 |
| 2003/0057704 A1 * | 3/2003 | Baten | | F02B 63/04 290/3 |

(56) References Cited

U.S. PATENT DOCUMENTS

| | | | |
|---|---|---|---|
| 2003/0079479 A1* | 5/2003 | Kristich | F01D 25/28 60/797 |
| 2004/0081561 A1* | 4/2004 | Iwanami | F04C 29/0085 417/42 |
| 2004/0104577 A1* | 6/2004 | Alger | H02J 7/34 290/1 A |
| 2004/0174723 A1* | 9/2004 | Yamanaka | H02M 1/32 363/37 |
| 2006/0066105 A1* | 3/2006 | Johnson | H01M 8/04201 290/1 A |
| 2006/0066108 A1* | 3/2006 | Willets | H02J 9/061 290/10 |
| 2006/0080971 A1* | 4/2006 | Smith | F01D 21/003 60/797 |
| 2006/0208594 A1* | 9/2006 | Kashihara | H02K 3/28 310/179 |
| 2006/0260331 A1* | 11/2006 | Andreychuk | F04B 17/06 62/50.2 |
| 2007/0108771 A1* | 5/2007 | Jones | H02P 9/102 290/44 |
| 2007/0121354 A1* | 5/2007 | Jones | H02P 9/102 363/47 |
| 2007/0216452 A1* | 9/2007 | Matsumoto | B60K 6/28 327/116 |
| 2009/0146426 A1* | 6/2009 | Jones | H02P 9/102 290/44 |
| 2009/0146500 A1* | 6/2009 | Jones | H02P 9/102 307/82 |
| 2009/0147549 A1* | 6/2009 | Jones | H02P 9/102 363/37 |
| 2009/0308602 A1* | 12/2009 | Bruins | E21B 43/26 166/250.01 |
| 2010/0060076 A1* | 3/2010 | Gemin | B60L 50/61 307/9.1 |
| 2010/0084922 A1* | 4/2010 | Gollentz | H02M 7/487 307/78 |
| 2012/0002454 A1* | 1/2012 | Kuboyama | H02M 7/487 363/132 |
| 2012/0175947 A1* | 7/2012 | Gemin | H02J 7/14 307/9.1 |
| 2012/0248922 A1* | 10/2012 | Imazawa | H02K 3/28 310/198 |
| 2012/0255734 A1* | 10/2012 | Coli | F04B 19/22 166/305.1 |
| 2013/0063070 A1* | 3/2013 | Zhang | H02M 5/4585 318/729 |
| 2013/0182468 A1* | 7/2013 | Guan | H02J 3/381 363/37 |
| 2013/0229836 A1* | 9/2013 | Wang | H02M 1/12 363/40 |
| 2013/0234522 A1* | 9/2013 | Tan | H02M 5/4585 307/72 |
| 2014/0096974 A1* | 4/2014 | Coli | B01F 7/00008 166/358 |
| 2014/0138079 A1* | 5/2014 | Broussard | E21B 43/26 166/66.4 |
| 2014/0174717 A1* | 6/2014 | Broussard | E21B 43/26 166/66.4 |
| 2014/0210213 A1* | 7/2014 | Campion | F02B 63/044 290/1 A |
| 2014/0312823 A1* | 10/2014 | Huang | H02M 5/4505 318/496 |
| 2015/0027712 A1* | 1/2015 | Vicknair | F17D 1/08 166/305.1 |
| 2015/0068754 A1* | 3/2015 | Coli | F04B 47/02 166/308.1 |
| 2015/0252661 A1* | 9/2015 | Glass | E21B 43/267 166/308.1 |
| 2015/0300145 A1* | 10/2015 | Coli | B01F 15/00538 166/308.1 |
| 2015/0314255 A1* | 11/2015 | Coli | B01F 15/00538 366/150.1 |
| 2016/0075387 A1* | 3/2016 | Fong | F02C 7/36 403/14 |
| 2016/0177675 A1* | 6/2016 | Morris | F02C 7/20 166/308.1 |
| 2016/0177678 A1* | 6/2016 | Morris | F01D 25/30 60/772 |
| 2016/0369609 A1* | 12/2016 | Morris | F04B 17/06 |
| 2017/0104389 A1* | 4/2017 | Morris | E21B 41/00 |
| 2017/0302135 A1 | 10/2017 | Cory | |
| 2018/0080376 A1* | 3/2018 | Austin | F16M 3/00 |
| 2018/0080377 A1* | 3/2018 | Austin | B60D 1/00 |
| 2019/0229643 A1* | 7/2019 | Bax | H02M 7/487 |
| 2019/0331080 A1* | 10/2019 | Tunzini | F02N 11/087 |
| 2020/0109617 A1* | 4/2020 | Oehring | H02B 1/20 |

FOREIGN PATENT DOCUMENTS

| | | |
|---|---|---|
| CN | 204386465 U | 6/2015 |
| CN | 110118127 A | 8/2019 |

* cited by examiner

POWER SUPPLY SEMI-TRAILER FOR ELECTRIC DRIVE FRACTURING EQUIPMENT

TECHNICAL FIELD

The present invention relates to the technical field of oil-gas exploitation, and specifically to a power supply semi-trailer for electric drive fracturing equipment.

BACKGROUND

In a configuration mode of a power transmission system used in conventional fracturing equipment on fracturing sites in oil and gas fields all over the world, a diesel engine is connected to a transmission to drive a fracturing plunger pump through a transmission shaft to work. This configuration mode has the following disadvantages: (1) Large volume and heavy weight: When the diesel engine drives the transmission to drive the fracturing plunger pump through the transmission shaft, a large volume is occupied, a heavy weight is involved, the transportation is restricted, and the power density is low. (2). Environmental problems: During operations on a well site, the fracturing equipment driven by the diesel engine would generate engine waste gas pollution and noise pollution. The noise exceeding 105 dBA will severely affect the normal life of nearby residents. (3). Cost inefficiency: The fracturing equipment driven by the diesel engine requires relatively high initial purchase costs and incurs high fuel consumption costs for unit power during operation, and the engine and the transmission also require very high routine maintenance costs. Efforts are made globally to manufacture oil-gas exploitation equipment with "low energy consumption, low noise, and low emission". Therefore, the foregoing disadvantages of conventional fracturing equipment that uses the diesel engine as the power source impedes the exploitation progress of unconventional oil and gas sources to some extent.

It is a good solution for replacement of conventional diesel engine driven equipment with electric drive equipment. However, high-voltage generators are employed in conventional power supply schemes by generators, i.e., rectifier transformers need to be used to supply power to the rectifying units, while the rectifier transformers are too bulky, expensive, and involve complex wiring. The above features of the rectifier transformers themselves, to some extent, result in the power supply part in the electric drive equipment are bulky, i.e., occupy a large area, expensive, and involve complex wiring, thus greatly limiting the widely use of the electric drive equipment.

Therefore, a power supply semi-trailer for electric drive fracturing equipment is urgently needed that is small in size, low in cost, and simple in wiring.

SUMMARY

To overcome the deficiencies in the prior art, an objective of the present invention is to provide a power supply semi-trailer for electric drive fracturing equipment, including a combination of a gas turbine engine, a generator and a rectifying unit, the generator is connected to the rectifying units directly to obviate conventional rectifier transformer equipment. The rectifying unit is connected to the inversion unit through a common DC bus, so that the common DC bus can separately drive multiple inversion units, thus decreasing the wirings of power supply lines. A high voltage inversion unit is disposed on a gooseneck of the electric drive semi-trailer to optimize the spatial arrangement of equipment. The entire power supply equipment has a compact structure, occupies a small area, and is simple in wiring.

The objective of the present invention is achieved by the following technical measures: a power supply semi-trailer for electric drive fracturing equipment, including a power supply semi-trailer body, one gas turbine engine, one generator, multiple sets of rectifying units and multiple sets of inversion units, wherein the gas turbine engine, the generator and the rectifying units are integrated on the power supply semi-trailer body; one end of the generator is connected to the gas turbine engine, the other end of the generator is connected to the rectifying units, the multiple sets of rectifying units are arranged side by side; the inversion units are disposed on a gooseneck of the electric drive semi-trailer body, and the rectifying units are connected to the inversion units through a common DC bus.

Further, the generator is a double-winding generator.

Further, the generator is connected to the rectifying units directly.

Further, a phase difference of double winding of the generator is 30°, and the winding configuration is type Y-Y or type D-D.

Further, the power of the generator is at least 10 MVA, and the frequency is 50-60 Hz or 100-120 Hz.

Further, the voltages of the rectifying units ranges from 4000 VDC to 6500 VDC.

Further, each of the inversion units includes two inverters, and the inverters are three-level inverters.

Further, the inversion units disposed on another gooseneck of the semi-trailer are high voltage inversion units.

Compared with the prior art, the beneficial effects of the present invention are as follows:

1. Employing a combination of a gas turbine engine, a generator and rectifying units, the generator is connected to the rectifying units directly to obviate conventional rectifier transformer equipment.

2. The rectifying units are connected to the inversion units through a common DC bus, so that the common DC bus can separately drive multiple inversion units, thus decreasing the wirings of power supply lines.

3. A high voltage inversion unit is disposed on a gooseneck of the electric drive semi-trailer to optimize the spatial arrangement of equipment.

4. The entire power supply equipment has a compact structure, occupies a small area, and is simple in wiring.

5. The output power of the entire power supply equipment is high, providing a forceful guarantee for the high-power electric drive fracturing equipment.

The present invention will be described in detail below with reference to the accompanying drawings and specific implementations.

Wherein, 1. power supply semi-trailer body, 2. gas turbine engine, 3. generator, 4. rectifying unit, 5. high voltage inversion unit, 6. electric drive fracturing equipment, 7.

gooseneck, 8. electric drive semi-trailer body, 9. double-winding generator, 10. three-level inverter, 11. common DC bus, and 12. plunger pump.

DESCRIPTION OF THE EMBODIMENTS

Figure 1:
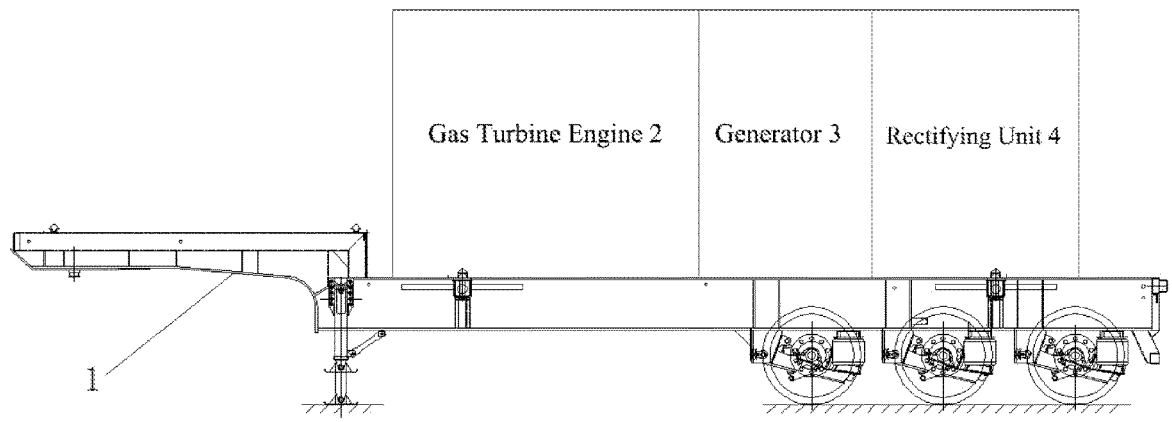
FIG. 1 is a schematic structural diagram of a power supply semi-trailer.
Figure 2:
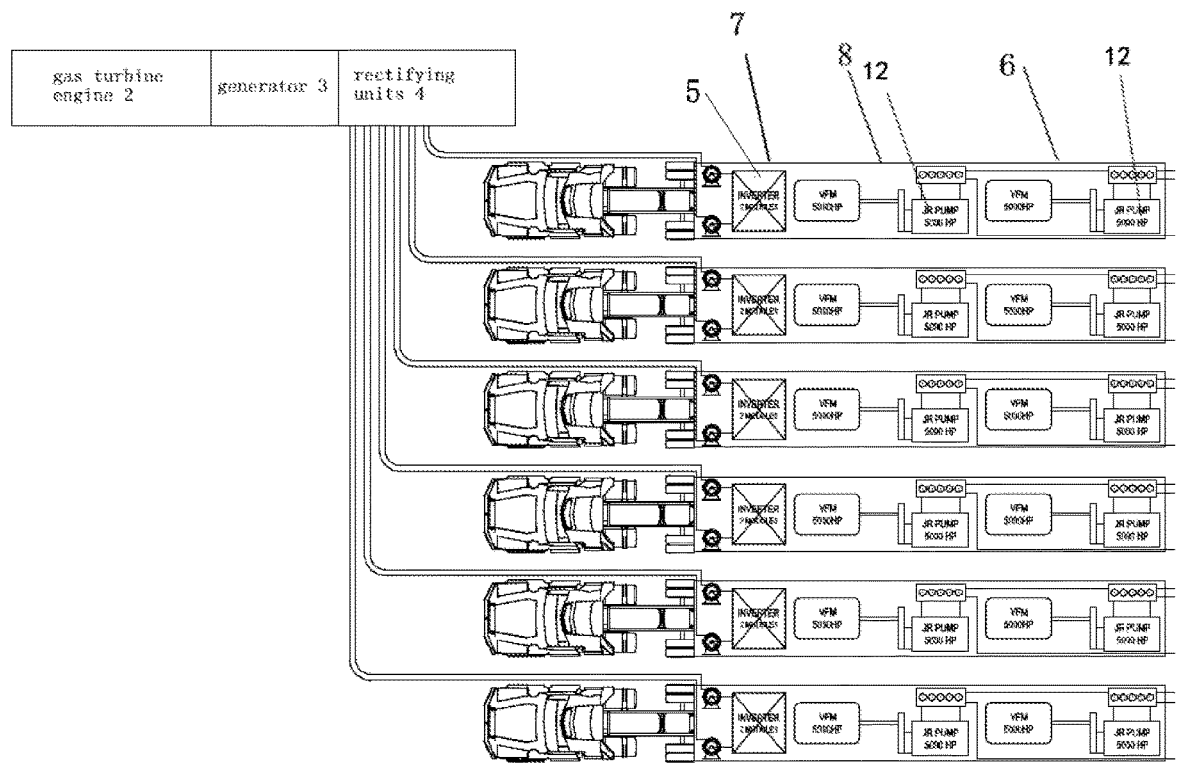
FIG. 2 is a schematic structural diagram of an electric drive fracturing equipment.
Figure 3:
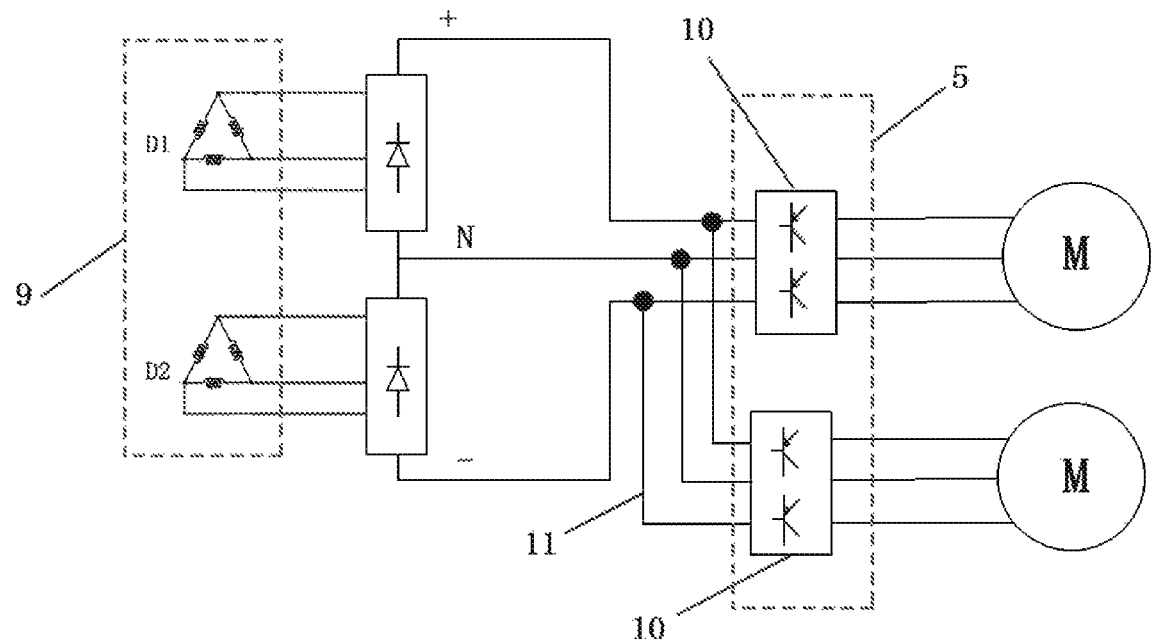
FIG. 3 is a schematic diagram of electrical connection of a generator in D-D configuration.
Figure 4:
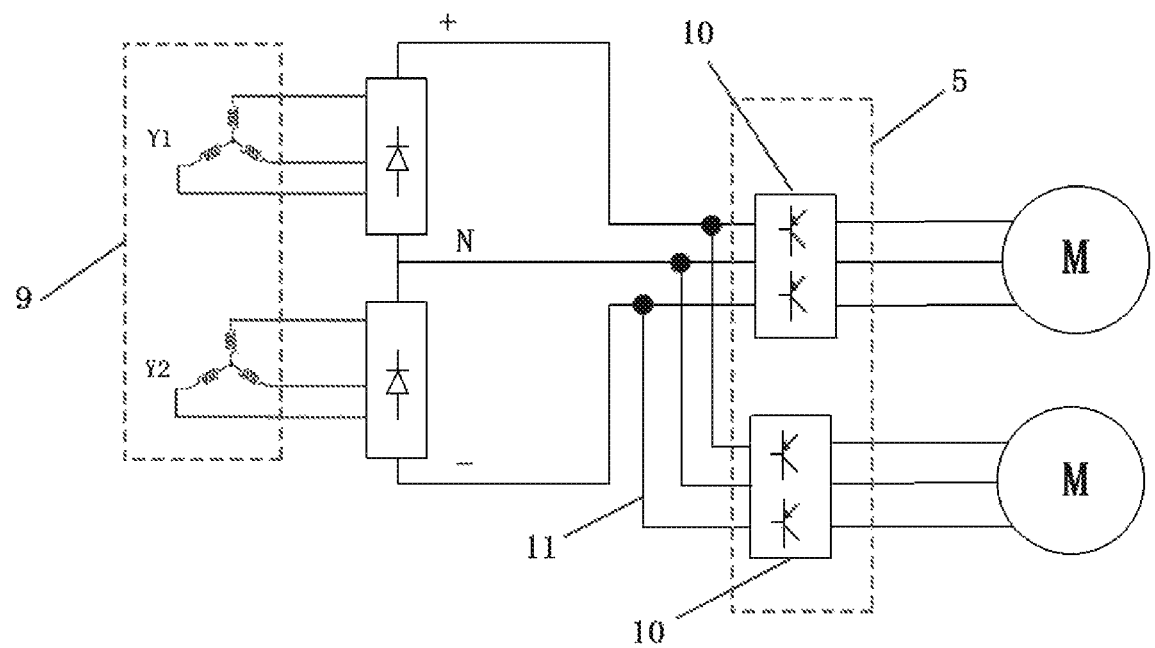
FIG. 4 is a schematic diagram of electrical connection of a generator in Y-Y configuration.

As shown in FIGS. 1 to 2, an embodiment provides a power supply semi-trailer for electric drive fracturing equipment, including a power supply semi-trailer body 1, one gas turbine engine 2, one generator 3, multiple sets of rectifying units 4 and multiple sets of inversion units, wherein the gas turbine engine 2, the generator 3 and the rectifying units 4 are integrated on the power supply semi-trailer body 1; one end of the generator 3 is connected to the gas turbine engine 2, the other end of the generator 3 is connected to the rectifying units 4, the multiple sets of rectifying units 4 are arranged side by side; the inversion units are disposed on a gooseneck of the electric drive semi-trailer body, and the rectifying units 4 are connected to the inversion units through a common DC bus. The generator 3 is a double-winding generator. The generator 3 is connected to the rectifying units 4 directly. The power supply semi-trailer is a power supply semi-trailer matched with the electric drive fracturing equipment, which is provided with a combination of a gas turbine engine 2, a generator 3 and a rectifying unit 4 integrated on a power supply semi-trailer body 1. The generator 3 is connected to the rectifying unit 4 directly. This power supply mode directly obviates the rectifier transformer equipment in conventional power supply, making the volume of the power supply semi-trailer smaller. The rectifying units 4 are connected to the inversion units through a common DC bus, so that the common DC bus can separately drive multiple inversion units, thus decreasing the wirings of power supply lines, and simplifying the circuit connection, the wiring becoming more easier.

The inversion units disposed on a gooseneck of the electric drive semi-trailer body are high voltage inversion units 5. The high voltage inversion units 5 are disposed on a gooseneck of the electric drive semi-trailer body to optimize the spatial arrangement of equipment, so that the entire electric drive fracturing equipment has a compact structure, and occupies a small area.

The phase difference of double winding of the generator 3 is 30°, the winding configuration is type Y-Y or type D-D. The alternating voltage output from the generator 3 ranges from 1600 VAC to 2300 VAC.

The power of the generator 3 is at least 10 MVA, the frequency is 50-60 Hz or 100-120 Hz, and the voltages of the rectifying units 4 are 4000 VDC or above, and further the voltages of the rectifying units ranges from 4000 VDC to 6500 VDC, ensuring that the power supply semi-trailer has a high output power to drive a high-power electric drive fracturing semi-trailer.

As shown in FIG. 2, it is a schematic diagram of connection between the power supply semi-trailer and the high-power electric drive fracturing semi-trailer. The rectifying units 4 on the power supply semi-trailer body 1 are connected to the inversion units disposed on the gooseneck of the electric drive semi-trailer body through a common DC bus. Each of the inversion units has a compartment structure provided with two three-level inverters. Each inverter can drive one electric motor to work independently. Electric motors are used to drive the plunger pump to work, providing a forceful guarantee for the power supply of the high-power electric drive equipment. The lubricating oil radiator is used to cool the lubricating oil in the plunger pump. An electrical control cabinet is used to implement local manipulation of the electric drive fracturing semi-trailer.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

What is claimed is:

1. A power supply semi-trailer for electric drive fracturing equipment, comprising a power supply semi-trailer body, one gas turbine engine, one generator and multiple sets of rectifying units, wherein the gas turbine engine, the generator and the rectifying units are integrated on the power supply semi-trailer body; one end of the generator is connected to the gas turbine engine, the other end of the generator is connected to the rectifying units, the generator is a double-winding generator, wherein the generator is connected to the rectifying units directly.

2. The power supply semi-trailer for electric drive fracturing equipment according to claim 1,
wherein the double-winding generator has a phase difference of 30° and a winding configuration of type Y-Y or type D-D.

3. The power supply semi-trailer for electric drive fracturing equipment according to claim 1, wherein the generator has a power of at least 10 MVA, and a frequency of 50-60 Hz or 100-120 Hz.

4. The power supply semi-trailer for electric drive fracturing equipment according to claim 1, wherein the rectifying units have voltages ranging from 4000 VDC to 6500 VDC.

5. The power supply semi-trailer for electric drive fracturing equipment according to claim 1, wherein the multiple sets of rectifying units are arranged side by side.

6. An electric drive fracturing equipment comprising the power supply semi-trailer of claim 2 or 5, further comprising multiple sets of fracturing semi-trailers, each set of the fracturing semi-trailer comprises a fracturing semi-trailer body and one set of inversion unit, and the rectifying units are connected to the inversion units through common dc buses; each set of the inversion unit comprises two inverters, and the inverters are three-level inverters.

7. The electric drive fracturing equipment according to claim 6, wherein the inversion units are high voltage invert units, and the inversion units are arranged on the gooseneck of the fracturing semi-trailer.

8. The electric drive fracturing equipment according to claim 6, wherein the fracturing semi-trailer is further provided with an electric motor and a plunger pump, the inversion units are connected to the electric motor and the electric motor is connected to the plunger pump.

* * * * *